(12) United States Patent
Randazzo

(10) Patent No.: US 8,733,240 B2
(45) Date of Patent: May 27, 2014

(54) SYSTEM FOR AUTOMATED DESTEMMING

(76) Inventor: Joseph A. Randazzo, Aiken, SC (US)

( * ) Notice: Subject to any disclaimer, the term of this patent is extended or adjusted under 35 U.S.C. 154(b) by 263 days.

(21) Appl. No.: 13/229,169

(22) Filed: Sep. 9, 2011

(65) Prior Publication Data

US 2013/0064950 A1    Mar. 14, 2013

(51) Int. Cl.
*A23N 15/02* (2006.01)
(52) U.S. Cl.
USPC ........ 99/640; 99/637; 198/345.1; 198/341.05
(58) Field of Classification Search
USPC ................... 198/345.1, 341.05; 99/640, 637
See application file for complete search history.

(56) References Cited

U.S. PATENT DOCUMENTS

| | | | |
|---|---|---|---|
| 1,775,918 A | | 9/1930 | Smith |
| 2,293,121 A | * | 8/1942 | Dudley, Jr. .................. 198/380 |
| 2,342,358 A | * | 2/1944 | Minera ......................... 426/484 |
| 2,688,993 A | | 9/1954 | White |
| 3,104,691 A | | 9/1963 | Minera |
| 3,319,679 A | | 5/1967 | Creed |
| 4,187,545 A | * | 2/1980 | Wallace et al. ............... 700/213 |
| 4,337,693 A | | 7/1982 | Dandrea |
| 4,532,757 A | * | 8/1985 | Tutle ............................ 56/328.1 |
| 4,843,561 A | | 6/1989 | Larson |
| 5,390,590 A | | 2/1995 | Mendenhall |
| 5,579,671 A | * | 12/1996 | Bowlin ........................... 83/75.5 |
| 6,610,953 B1 | | 8/2003 | Tao et al. |
| 2008/0289515 A1 | | 11/2008 | Knorr et al. |
| 2009/0191928 A1 | | 7/2009 | Snyder, Jr. et al. |
| 2009/0217793 A1 | | 9/2009 | Spillner et al. |
| 2010/0292841 A1 | | 11/2010 | Wickham |

FOREIGN PATENT DOCUMENTS

| | | |
|---|---|---|
| JP | 10076233 A | 3/1998 |
| KR | 200264125 B1 | 2/2002 |
| KR | 100851925 B1 | 8/2008 |

OTHER PUBLICATIONS

International Search Report and Written Opinion issued in corresponding International Application No. PCT/US2012/051856 on Feb. 28, 2013. 11 pages.

\* cited by examiner

*Primary Examiner* — Anthony Weier
(74) *Attorney, Agent, or Firm* — Maier & Maier, PLLC

(57) ABSTRACT

A destemmer system may be shown. The destemmer system may have a cleated conveyor belt with a first end and a second end. An orientator system may be above the first end of the cleated conveyor belt. The orientator may have means for placing at least one stemmed object onto the cleated conveyor belt. A vision system may be between the first end and the second end of the cleated conveyor belt. A positioning system may be between the vision system and the second end of the cleated conveyor belt. A destemmer may be at the second end of the cleated conveyor belt.

13 Claims, 3 Drawing Sheets

SYSTEM FOR AUTOMATED DESTEMMING

BACKGROUND

Many fruits and vegetables require destemming prior to consumption. Destemming involves the removal of the stem either in the field or at the processing center. While farmers utilize automated harvesters to pick fruits and vegetables, manual labor generally must be used to offload, destem, sort and inspect the fruits and vegetables prior to further automated processing. Manual destemming has led to many problems in the industry within the United States.

Farmers must have manual labor to destem harvested fruits and vegetables, which leads to a dependence on migrant labor and an overall increase in costs. Manual destemming leads to increased competition from countries with government subsidized programs and countries with cheap labor. The labor intensive process of manual destemming is time consuming and leads to known bottlenecks in the harvesting process. Finally, industry standards with various fruits and vegetables have made automated destemming impractical. For example the pepper industry requires stems to be pulled, not cut, so that peppers remain intact for cooking, and to eliminate wasted product that results from cutting.

SUMMARY

According to one exemplary embodiment a destemmer system may be shown. The destemmer system may have a cleated conveyor belt with a first end and a second end. An orientator system may be above the first end of the cleated conveyor belt. The orientator may have means for placing at least one stemmed object onto the cleated conveyor belt. A vision system may be between the first end and the second end of the cleated conveyor belt. A positioning system may be between the vision system and the second end of the cleated conveyor belt. A destemmer may be at the second end of the cleated conveyor belt.

According to another exemplary embodiment, a method of destemming a stem from a stemmed object may be shown. The method may include the steps of orienting the stemmed object in an orientator system such that the at least one stemmed object is in a single layer on a cleated conveyor belt. An image of the stemmed object may be acquired and the position of a stem may be determined based on the image. At least one air jet may be activated to bias the stem to a side of the cleated conveyor belt. The stemmed object may be depressed between a crush pad and an individual cleat of the cleated conveyor belt. A pulley on a side of the cleated conveyor belt may be driven using a motor driven belt. The stemmed object may pass over the pulley such that the stein may engage the pulley and motor driven belt to remove the stem.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
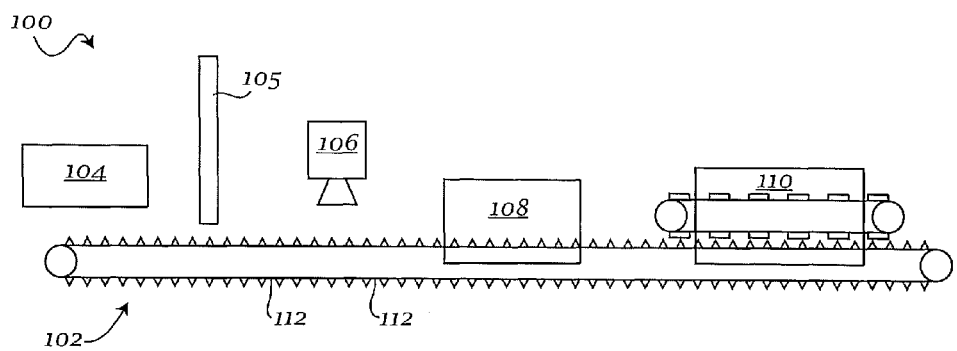
FIG. 1 is an exemplary embodiment of a destemmer system.

Generally referring to FIG. 1, an exemplary embodiment of a destemmer system 100 may be shown. Destemmer system 100 may have cleated conveyor belt 102, an orientator 104, a vision system 106, a positioning system 108, and a destemmer 110. Cleated conveyor belt 102 may have a series of cleats 112 that may be sized to receive an individual fruit or vegetable for destemming from orientator 104, as further described with reference to FIGS. 2a-b. As demonstrated below, the system will be described with reference to a pepper destemmer, but destemmer system 100 may be used with any stemmed fruit or vegetable as is known by a person of ordinary skill in the art. In one exemplary embodiment, cleats 112 may be approximately two inches high and three inches wide, and each cleat may receive, for example, an individual pepper for destemming. In another exemplary embodiment, destemmer system 100 may have a plurality of cleated conveyor belts, each with an independent orientator, vision system, positioning system, and destemmer.

Figure 2A:
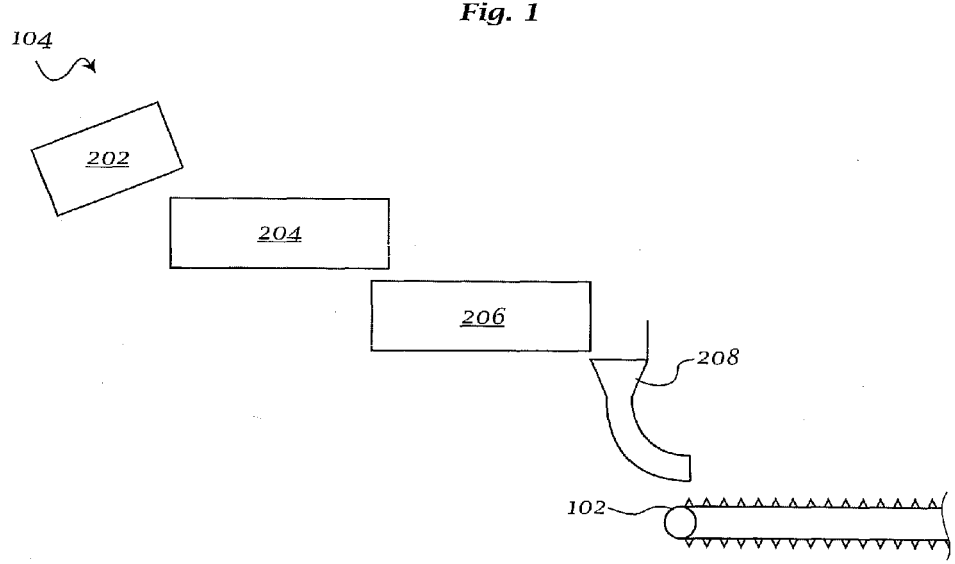
FIG. 2a is side view of an exemplary embodiment of an orientator for a destemmer system.

Referring now to FIG. 2a, an exemplary embodiment of a side view of orientator 104 may be shown. As shown previously in FIG. 1, orientator 104 may be positioned above cleated conveyor belt 102. Orientator 104 may receive peppers from a feed conveyor 202. Feed conveyor 202 may be, for example, an inclined feed conveyor. Feed conveyor 202 may feed peppers onto a first shaker table 204. First shaker table 204 may be a non-corrugated shaker table and may be of any suitable dimension as is known in the art. For example, first shaker table 204 may be approximately 12 inches wide, 48 inches long and 4 inches deep. First shaker table 204 may have means for leveling peppers received from feed conveyor 202 such that peppers are spread in a single layer along the width of shaker table 204. First shaker table 204 may have a specific frequency and rotational moment to advance the single layer of peppers onto second shaker table 206.

Still referring to FIG. 2a, second shaker table 206 may be a corrugated shaker table and may be of any suitable dimensions as is known in the art. For example, second shaker table 206 may be approximately 12 inches wide, 48 inches long and 4 inches deep. Second shaker 206 may have a series of longitudinal corrugations across its length. For example, second shaker table 206 may have four longitudinal corrugations. In alternative embodiments, second shaker table 206 may have any number of longitudinal corrugations.

Second shaker table 206 may be below first shaker table 204 such that the single layer of peppers advancing from first shaker table 204 may fall within the longitudinal corrugations of second shaker table 206. Longitudinal corrugations may be, for example, V-shaped to receive peppers. Alternatively, longitudinal corrugations may be any shape suitable to receive and orient peppers from first shaker table 204. Second shaker table 206 may have a specific frequency and rotational moment to advance the peppers in each longitudinal corrugation into a respective chute 208. Peppers may fall off second shaker table 206 into chute 208. Orientator 104 may have one chute 208 associated with each longitudinal corrugation of second shaker table 206. Each chute 208 may direct peppers into specific cleats 112 of cleated conveyor belt 102 for advancement to vision system 106.

Figure 2B:
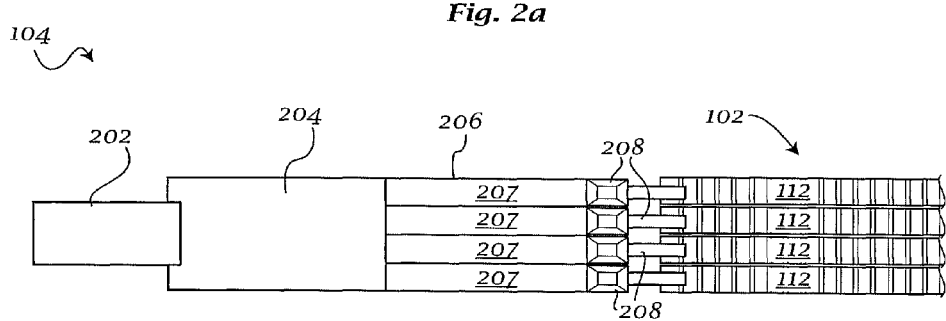
FIG. 2b is a top view of an exemplary embodiment of orientator for a destemmer system.

Referring now to FIG. 2b, an exemplary embodiment of a top view of orientator 104 as described in FIG. 2a may be shown. As described above, feed conveyor 202 may deposit peppers onto first shaker table 204. First shaker table 204 may level peppers to a single layer and advance peppers to second shaker table 206. Second shaker table 206 may have a plurality of longitudinal corrugations 207 to receive peppers from first shaker table 204. Peppers may fall from longitudinal corrugations 207 of second shaker table 206 into respective chutes 208. Peppers may advance from chutes 208 into respective cleats 112 of cleated conveyor belt 102 for advancement to vision system 106.

Figure 3A:
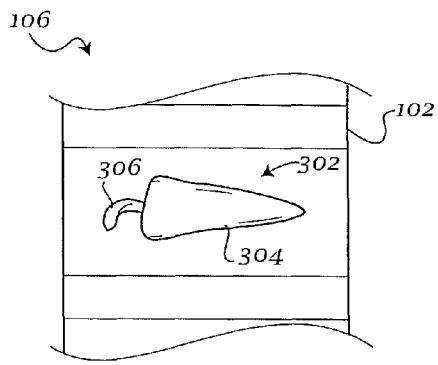
FIG. 3a is an exemplary embodiment of a vision system for a destemmer system.
Figure 3B:
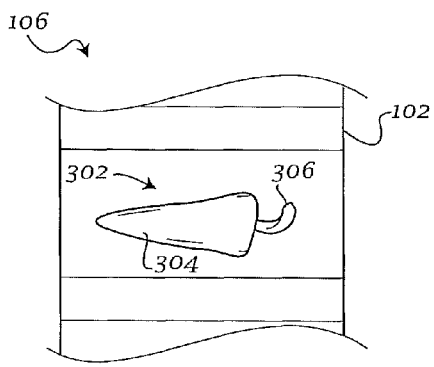
FIG. 3b is another exemplary embodiment of a vision system for a destemmer system.

Referring generally now to FIGS. 3a-b, an exemplary embodiment of vision system 106 may be shown. As described above with respect to FIGS. 1 and 2a-b, peppers may advance from chutes 208 into respective cleats 112 of cleated conveyor belt 102 for advancement to vision system 106. Vision system 106 may have a vision camera (not shown) for each lane of cleated conveyor belt 102. The vision cameras may be, for example, a digital camera. Alternatively, the vision camera may be any type of camera as is known to a person of ordinary skill in the art. Vision system 106 may have, for example, a cleat sensor to initiate image acquisition by the vision cam. Alternatively, vision acquisition may be initiated manually or automatically by other means known to a person of ordinary skill in the art. Cleated conveyor belt 102 may be a backlit opaque conveyor belt to create a good contrast for vision system 106.

As shown generally in FIGS. 3a-b, vision cam may acquire an image of a whole pepper 302 in a vision area of cleated conveyor belt 102. Pepper 302 may have a body 304 and a stem 306. Vision system 106 may be equipped with software that may inspect the pepper 302 through a series of algorithms programmed into the vision camera. The software may be internal to the vision camera. The software may be programmed to select features of the imaged peppers within specific parameters. For example, in one exemplary embodiment, the software may be programmed to distinguish stem 306 from body 304 to determine the left/right orientation of pepper 302 on cleated conveyor belt 102.

As shown in FIG. 3a, the software may detect the whole pepper 302 and may note a largest divergence (representing stem 306) on a left side of the image. Alternatively, as shown in FIG. 3b, the software may detect the whole pepper 302 and may note a largest divergence (representing stem 306) on a right side of the image. As will be described in more detail below, vision system 106 may activate an air jet from either side of pepper 302 to move the pepper 302 such that pepper stem 306 extends over an edge of cleated conveyor belt 102.

Figure 4A:
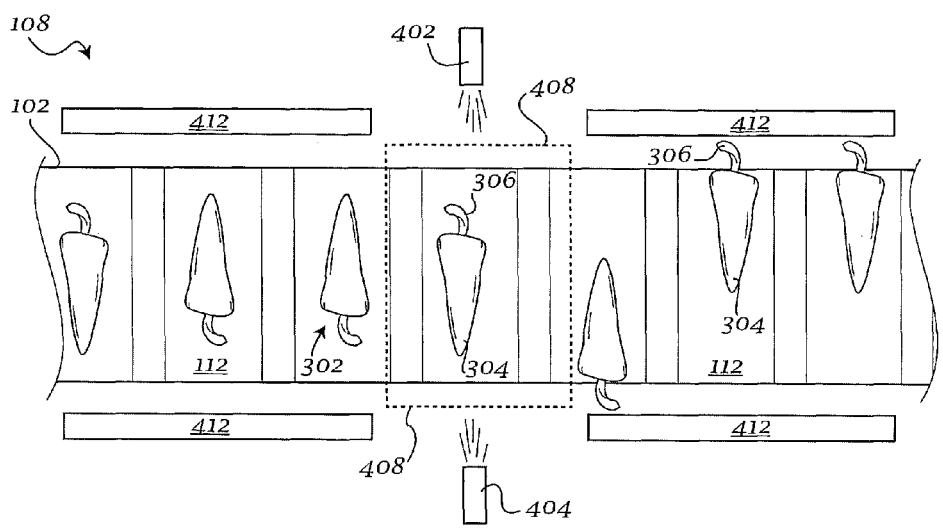
FIG. 4a is a top view of an exemplary embodiment of positioning system for a destemmer system.
Figure 4B:
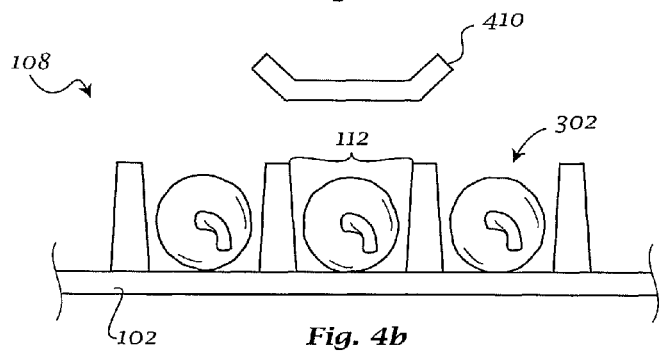
FIG. 4b is a side view of an exemplary embodiment of a positioning system for a destemmer system.

Referring now to FIGS. 4a-b, an exemplary embodiment of a process flow of positioning system 108 may be shown. FIG. 4a may show a top view of positioning system 108. As previously described, pepper 302 may be positioned between individual cleats 112 of cleated conveyor belt 102. After vision system 106 acquires an image of pepper 302 and performs the appropriate calculations to determine orientation of stem 306, the software may enable an air jet on either side of cleated conveyor belt 102. For example, as shown in FIG. 4a, positioning system may have an air jet 402 and an air jet 404 on opposite sides. Positioning system may receive information from vision system 106 indicating that stem 306 is on the side opposite jet 402, nearest jet 404. As a result, the software may enable air jet 402 to fire. Positioning system 108 may have a cleat sensor 406 on cleated conveyor belt 102. In an exemplary embodiment, cleat sensor 406 may be a distance of one and a half times the width of an individual cleat 112 before the center of the vision camera of vision system 106. As a result, when a leading edge of individual cleat 112 passes cleat sensor 406, the camera and air nozzle may each be centered on an individual cleat 112. In alternative embodiments, cleat sensor 406 may be located in any suitable location in destemmer system 110. In operation, a leading edge of individual cleat 112 may trip cleat sensor 406, signaling the enabled air jet 402 to fire an air pulse (depicted by lines from air jet 402 in FIG. 4a). The air pulse may provide sufficient force to move pepper 302 such that stem 306 extends over an edge of cleated conveyor belt 102. After firing, air jets 402 and 404 may be configured to reset for the next instruction from vision system 106. In an alternative embodiment, a timing wheel may initiate image acquisition and may cause vision system 106 to execute instructions for positioning system 108 of the previous acquisition at the same time.

Positioning system 108 may have screens 408 between each air get 402 and 404 and cleated conveyor belt 102. Screens 408 may be approximately 0.5 inches beyond the edge of cleated conveyor belt 102. Alternatively screens 408 may be any appropriate distance from the edge of cleated conveyor belt 102 to allow for destemming while maintaining the pepper 302 on cleated conveyor belt 102. Screens 408 may dissipate air to prevent bounce back from trapped air. An airflow diverter (not shown) may redirect airflow to beneath cleated conveyor belt 102 to prevent repositioning of the peppers on adjacent conveyors.

FIG. 4*b* may show a side view top view of positioning system 108. As described above peppers 302 may be positioned between individual cleats 112 of cleated conveyor belt 102. A leading edge of an individual cleat 112 may trigger cleat sensor 406, signaling the appropriately enabled air jet to fire an air pulse (depicted by lines from air jet 402 in FIG. 4*a*). Positioning system 108 may have a roof shield 410 above individual cleats 112. In one exemplary embodiment, roof shield 410 may be positioned approximately 0.5 inches above cleats 112 such that peppers 302 are not ejected from the cleat position when the air jets are fired. Alternatively, roof shield 410 may be any appropriate distance above individual cleats 112 to allow for peppers to easily slide into position while still providing sufficient air volume and direction. After positioning, peppers may proceed on cleated conveyor belt 102 to destemmer 110.

Figure 5:
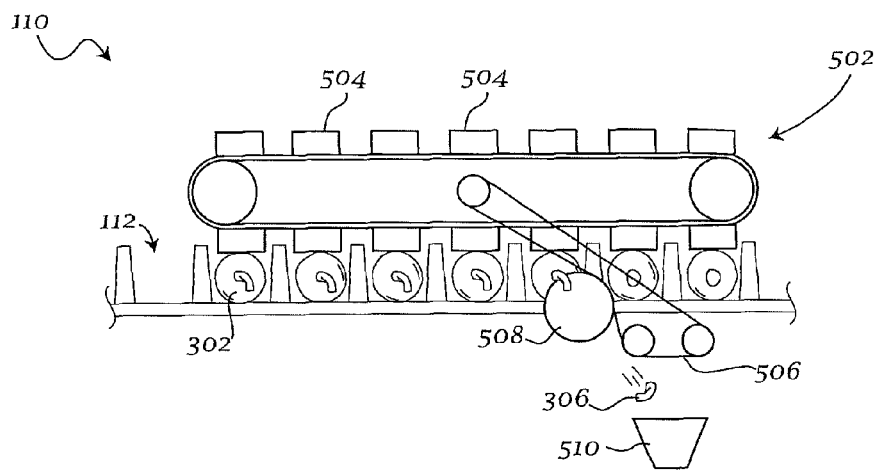
FIG. 5 is an exemplary embodiment of a destemmer for a destemmer system.

FIG. 5 may show an exemplary side view of destemmer 110. Destemmer 110 may be, for example, a rotary destemmer. Destemmer 110 may have an over-conveyor 502. Over-conveyor 502 may have crush pads 504 spaced to come down between individual cleats 112 to firmly hold peppers in place during destemming. In operation, crush pads 504 may slightly crush peppers to release the calyx (rigid stem and flowerset) from the more pliable pod of peppers 302. The rigid calyx may not depress under the crush pads 504 at the same rate as the pod so that the pod may separate from the calyx with minimal pod damage.

Still referring to FIG. 5, over-conveyor 502 and cleated conveyor belt 102 may be powered by the same motor and may be geared such that the relationship between the crush pads 504 and the individual cleats 112 is maintained. Peppers 302 in individual cleats 112 are thus trapped by crush pads 504 to hold them firmly in place. As peppers 302 progress down cleated conveyor belt 102, stems 306 are guided toward a motor driven belt 506 driving a pulley 508. The combination of the belt 506 and pulley 508 may pull down on stem 306 of pepper 302 as the stem 306 rounds pulley 508. The downward pull of the belt 506 and pulley 508 may cause the stem 306 to release from the body 304 of pepper 302 with little or no damage to body 304. Released stems 306 may travel around pulley 508 and drop into a receptacle 510 for disposal. The peppers 302, now without stems, may continue down cleated conveyor belt 102 for further processing.

Figure 6:
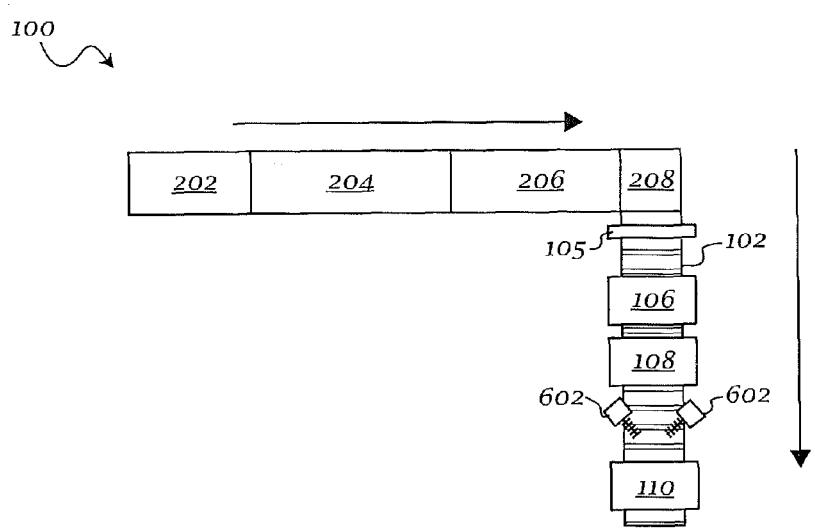
FIG. 6 is a top view of an exemplary embodiment of a destemmer system.

FIG. 6 may show an exemplary top view of destemmer system 100 as previously described with reference to FIGS. 1-5. The process flow of peppers is depicted by the arrows in FIG. 6. The entire system may be oriented in an "L" configuration as shown. Alternatively, the system may be oriented in a straight line or any other feasible orientation. Peppers initially enter the system via orientator 104. Orientator 104 includes a feed conveyor 202, a first shaker table 204, and a second shaker table 206 as previously described with reference to FIGS. 2*a-b*. Peppers then fall onto individual cleats 112 of cleated conveyor belt 102 via chutes 208. In some exemplary embodiments at least one plastic sheet 105 may drag the beginning of cleated conveyor belt 102 to prevent pepper stacking. In another exemplary embodiment at least one angled brush or rotating assembly may push stacked peppers back to the next empty cleat position.

Peppers continue down the process flow of cleated conveyor belt 102 to vision system 106 for image acquisition as previously described with reference to FIGS. 3*a-b*. Vision system 106 may use software to determine the left-right stem orientation of peppers on cleated conveyor belt 102 and sends this information to positioning system 108. Positioning system 108 uses the information received from the software to move the peppers within individual cleats 112 such that the stem hangs over an edge of cleated conveyor belt 112 as described with reference to FIGS. 4*a-4b*. In one exemplary embodiment, cleated conveyor belt 102 may additionally have rotating brushes 602 after positioning system 108. Rotating brushes 602 may be angled to ensure that peppers are completely biased to one side so that stems are against the screens 408 as described with reference to FIG. 4*b*. Peppers may proceed down cleated conveyor belt 102 to destemmer 110 where peppers are destemmed as described with reference to FIG. 5.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A destemmer system, comprising:
   a cleated conveyor belt with a first end and a second end;
   an orientator above the first end of the cleated conveyor belt, the orientator having means for placing at least one stemmed object onto the cleated conveyor belt;
   a vision system between the first end and the second end of the cleated conveyor belt, wherein the vision system further comprises:
   a vision camera;
   vision acquisition software operating on the vision camera, the vision acquisition software programmable to acquire an image of the stemmed object on the cleated conveyor belt; and
   communication means for communicating with a positioning system;
   the positioning system located between the vision system and the second end of the cleated conveyor belt, wherein the positioning system further comprises:
   a first air jet on a first side of the cleated conveyor belt;
   a second air jet on a second side of the cleated conveyor belt, wherein said communication means activates either the first or second air jet depending on the image of the stemmed object acquired by the vision activation software in order to bias the stemmed object to one side of the cleated conveyor belt; and
   a destemmer at the second end of the cleated conveyor belt.

2. The destemmer system of claim 1, wherein the cleated conveyor belt has a plurality of individual, V-shaped cleats along a length of the cleated conveyor belt and running perpendicular thereto.

3. The destemmer system of claim 1, further comprising:
   a plurality of cleated conveyor belts each with a respective vision system, positioning system and destemmer.

4. The destemmer system of claim 1, wherein the orientator further comprises:
   an inclined feed conveyor;
   a non-corrugated shaker table;
   a corrugated shaker table; and
   at least one chute that feeds the at least one stemmed object onto the cleated conveyor belt in a single layer.

5. The destemmer system of claim 1, wherein the destemmer further comprises:

an over-conveyor located above the second end of the cleated conveyor belt;
a plurality of crush pads located on the over-conveyor;
a motor driven belt driving a pulley proximate at least one side of the second end of the cleated conveyor belt.

6. The destemmer system of claim 1, further comprising:
at least one angled rotating brush between the positioning system and the destemmer, to bias the stemmed object toward one side of the cleated conveyor belt.

7. The destemmer system of claim 1, wherein the cleated conveyor belt is approximately six feet long and one foot wide.

8. The destemmer system of claim 2, wherein the individual cleats are approximately two inches tall and three inches wide.

9. The destemmer system of claim 1, further comprising:
a cleat sensor that initiates the vision acquisition software and activates the first or second air jets.

10. The destemmer system of claim 1, further comprising:
a first screen between the first air jet and the first side of the cleated conveyor belt, and a second screen between the second air jet and the second side of the cleated conveyor belt.

11. The destemmer system of claim 1, wherein the positioning system further comprises:
a roof shield above the cleated conveyor belt and air walls on either side of the cleated conveyor belt.

12. The destemmer system of claim 1, wherein the cleated conveyor belt is a backlit opaque conveyor belt to create a contrast for the vision system.

13. The destemmer system of claim 1, further comprising:
at least one plastic sheet, curtain, or rotating assembly between the first end of the cleated conveyor belt and the vision system that hangs over the cleated conveyor belt.

* * * * *